(12) United States Patent
Patel et al.

(10) Patent No.: US 9,237,482 B2
(45) Date of Patent: Jan. 12, 2016

(54) METHOD OF TRANSMITTING REAL TIME TRAFFIC WITH REDUCED HEADER IN WIRELESS NETWORK

(71) Applicants: Satyen S. Patel, Vernon Hills, IL (US); Rajesh K. Benjamin, Lisle, IL (US); Rajesh D. Rasalkar, Bolingbrook, IL (US); Mallikarjun R. Bodepudi, Naperville, IL (US)

(72) Inventors: Satyen S. Patel, Vernon Hills, IL (US); Rajesh K. Benjamin, Lisle, IL (US); Rajesh D. Rasalkar, Bolingbrook, IL (US); Mallikarjun R. Bodepudi, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 139 days.

(21) Appl. No.: 13/731,710

(22) Filed: Dec. 31, 2012

(65) Prior Publication Data

US 2014/0185438 A1 Jul. 3, 2014

(51) Int. Cl.
*H04J 1/16* (2006.01)
*H04W 28/06* (2009.01)

(52) U.S. Cl.
CPC ............ *H04W 28/065* (2013.01); *H04W 28/06* (2013.01)

(58) Field of Classification Search
CPC .................................................... H04W 28/065
USPC .......................................................... 370/230
See application file for complete search history.

(56) References Cited

U.S. PATENT DOCUMENTS

| | | | |
|---|---|---|---|
| 2002/0064164 A1* | 5/2002 | Barany et al. | 370/401 |
| 2004/0148425 A1* | 7/2004 | Haumont et al. | 709/236 |
| 2010/0189103 A1* | 7/2010 | Bachmann et al. | 370/389 |
| 2010/0260129 A1* | 10/2010 | Ulupinar et al. | 370/329 |

* cited by examiner

*Primary Examiner* — Wei Zhao
(74) *Attorney, Agent, or Firm* — Fay Sharpe LLP

(57) ABSTRACT

In a mobile telecommunications network including a mobile User Equipment (UE) and a Packet Data Network (PDN) Gateway (PGW), a method is provided for controlling data packet header overhead for real time data packet traffic between the UE and the PGW. The method includes: modifying one or more data packets having an Internet Protocol (IP) header and a User Datagram Protocol (UDP) header to remove at least a portion of at least one of said IP and UDP headers prior to transporting said modified data packet between the UE and PGW; and reconstructing the removed header portions upon receipt of the modified data packet at one of the UE or PGW.

20 Claims, 3 Drawing Sheets

METHOD OF TRANSMITTING REAL TIME TRAFFIC WITH REDUCED HEADER IN WIRELESS NETWORK

BACKGROUND

The inventive subject matter relates generally to the art of mobile and/or wireless telecommunications. Particular but not exclusive relevance is found in connection with Long Term Evolution (LTE) wireless networks, the standards of which have been developed by the 3rd Generation Partnership Project (3GPP). Accordingly, the present specification makes specific reference thereto. It is to be appreciated however that aspects of the present inventive subject matter are also equally amenable to other like applications and/or network environments.

LTE and/or other broadband and/or Internet Protocol (IP) wireless networks are used at times to transmit real time voice, audio, video and/or other like real time traffic packets. For example, VoLTE (Voice over LTE) represents real time voice packet transmission over an LTE wireless network. However, one problem with carrying real time traffic packets over an LTE network is the relatively large User Datagram Protocol/Internet Protocol (UDP/IP) header overhead. For example, in such cases, a typical real time traffic packet may have: an IP header of 20 octets for IP version 4 (IPv4) or 40 octets for IP version 6 (IPv6); a UDP header of 8 octets (without a checksum) or 10 (with a checksum); and a Real-time Transfer Protocol (RTP) header of 12 octets. Accordingly, the total header is between 40 and 42 octets for IPv4 and between 60 and 62 for IPv6.

By comparison, the payload size (say for real time voice packets) depends on the speech coding and frame size being used, but it may be as low as 15 to 20 octets. This means the header can account for almost 50% to 67% overhead depending on the particular circumstances. The overhead is given by the payload size divided by the total header size. For example, assuming a 20 octet payload using IPv4 with no UDP checksum, the header overhead is 50%.

In telecommunications networks, it is generally desirable to conserve bandwidth, and in particular, in an LTE wireless network the air interface bandwidth can be a relatively costly resource. Accordingly, it can be desirable to reduce or eliminate header overhead where possible.

SUMMARY

This summary is provided to introduce concepts related to the present inventive subject matter. This summary is not intended to identify essential features of the claimed subject matter nor is it intended for use in determining or limiting the scope of the claimed subject matter.

Heretofore in LTE wireless networks there has been no suitable form of header compression between a Packet Data Network (PDN) Gateway (PGW) and the User Equipment (UE) for real time traffic packets.

To conserve air interface bandwidth between the UE and evolved Node-B (eNB), Robust Header Compression (RoHC) has been developed to compress header packets. However, RoHC does not remove the UDP/IP header completely and accordingly header overhead remains and in some cases it may be larger than would be desired. Additionally, RoHC is relatively complex and can add a significant processing burden to both the UE and eNB where resources for such processing can be scarce.

Accordingly, a new and/or improved system and/or method is disclosed which addresses the above-referenced challenge(s) and/or others.

In accordance with one embodiment, a method is provided for use in a mobile telecommunications network including a mobile User Equipment (UE) and a Packet Data Network (PDN) Gateway (PGW). The method reduces data packet header overhead for real time data packet traffic between the UE and the PGW. The method includes: modifying one or more data packets having an Internet Protocol (IP) header and a User Datagram Protocol (UDP) header to remove at least a portion of at least one of said IP and UDP headers prior to transporting said modified data packet between the UE and PGW; and reconstructing the removed header portions upon receipt of the modified data packet at one of the UE (10) or PGW (40).

In accordance with other embodiments, a Packet Data Network (PDN) Gateway (PGW) is provided for use in a mobile telecommunications network serving mobile User Equipment (UE). The PGW is operative to: receive real time traffic data packets from sent from a UE, the received data packets having had at least some portion of at least one of an Internet Protocol (IP) header and a User Datagram Protocol (UDP) header removed therefrom; and reconstruct the removed portions of said IP and UDP headers.

In accordance with another embodiment, a mobile User Equipment (UE) is provided for use in a mobile telecommunications network including a Packet Data Network (PDN) Gateway (PGW). The UE is operative to: modify real time traffic data packets so as to remove at least a portion of at least one of an Internet Protocol (IP) header and a User Datagram Protocol (UDP) header from the data packets; and send the modified data packets toward the PGW.

Numerous advantages and benefits of the inventive subject matter disclosed herein will become apparent to those of ordinary skill in the art upon reading and understanding the present specification.

BRIEF DESCRIPTION OF THE DRAWING(S)

The following detailed description makes reference to the figures in the accompanying drawings. However, the inventive subject matter disclosed herein may take form in various components and arrangements of components, and in various steps and arrangements of steps. The drawings are only for purposes of illustrating exemplary and/or preferred embodiments and are not to be construed as limiting. Further, it is to be appreciated that the drawings may not be to scale.

DETAILED DESCRIPTION OF THE EMBODIMENT(S)

Figure 1:
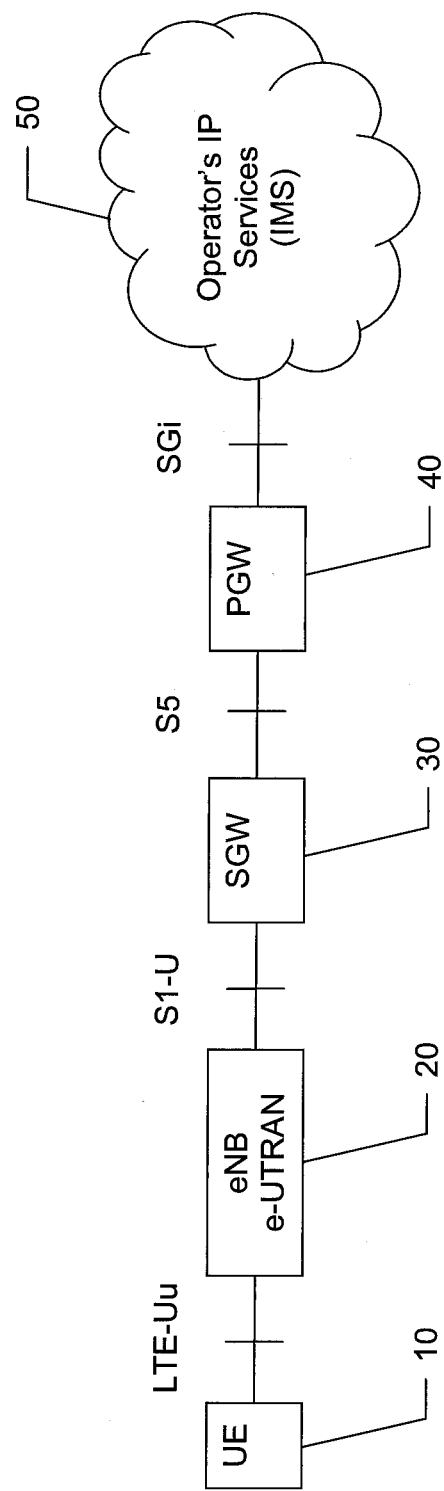
FIG. 1 is a diagrammatic illustration showing an exemplary network architecture suitable for practicing aspect(s) of the inventive subject matter.

For clarity and simplicity, the present specification shall refer to structural and/or functional elements, relevant standards and/or protocols, and other components that are commonly known in the art without further detailed explanation as to their configuration or operation except to the extent they have been modified or altered in accordance with and/or to accommodate the preferred embodiment(s) presented herein.

Described herein are method and system embodiments for eliminating and/or reducing header overhead for real time traffic packets transported over a wireless network, e.g., such as an LTE wireless network, between a UE and a PGW of the network. Suitably, this is achieved by striping, deleting, erasing and/or otherwise removing the UDP and IP headers from the relevant packets prior to transporting and/or transmitting the real time traffic packets, e.g., using a General Packet Radio Service (GPRS) Tunneling Protocol (GTP) and/or S5 interface, between the relevant network entities (NEs) or nodes (i.e., the UE and PGW).

More specifically, in one suitable embodiment, for uplink (UL) transmissions of packets from the UE toward the PGW, the UE removes the UDP and/or IP headers from the relevant packets prior to transmission of the packets toward the PGW. Conversely, for downlink (DL) transmission of packets from the PGW toward the UE, the PGW removes the UDP and/or IP headers from the relevant packets prior to transmission of the packets toward the PGW. In this way, the real time traffic packets are transported between the UE and PGW without the removed UDP and/or IP headers thereby reducing and/or eliminating header overhead and consequently conserving bandwidth.

In practice, the entire UDP and IP headers may be so removed to maximize the reduction and/or elimination of header overhead associated with the transport and/or transmission of real time traffic packets between the UE and PGW of a wireless network, such as, e.g., an LTE wireless network. However, in alternate embodiments, it is contemplated that only some portion of either or both of the UDP and IP headers may be so removed. In one suitable embodiment, prior to modifying any packets and/or stripping or removing any header information therefrom, a dedicated bearer is established between the UE and PGW and the respective NE may then employ the UDP/IP information contained in the relevant Traffic Flow Template (TFT).

Suitably, the PGW is also equipped, programmed and/or otherwise provisioned to identify relevant real time packet traffic calls and/or sessions for particular UEs and reconstruct appropriate UDP and/or IP headers and append or prepend the same to those packets received without their respective headers. Likewise, the UE may optionally be similarly equipped, programmed and/or otherwise provisioned to reconstruct UDP and/or IP headers for packets received without them from the PGW. In practice, the foregoing reconstruction is achieved with the aid of profiles provided in and/or provisioned at and/or otherwise accessible by the UE and PGW respectively. These profiles regulate and/or control the manner in which the respective headers and/or the fields thereof are rebuilt and/or provide the respective values and/or setting for the various fields of the headers.

The tables that follow list the various fields for respective headers which may be removed and/or reconstructed as described herein along with the size of each field (in bits) prior to removal/stripping of the relevant headers. Also shown in the tables are parameters and/or values for each field with respect to UL and DL packets which indicate and/or describe how each field is to be reconstructed. For example, "set" indicated in the table under the UL and/or DL packet columns means that the corresponding field value is set according to the respective profile. In particular, for UL packets, the header fields are set according to the corresponding PGW profile, and for DL packets, the header fields are set according to the corresponding UE profile. Conversely, "no" is indicated in the table under the UL and/or DL packet columns means that the corresponding field may be blank or unset.

IPv6 Header

| Field | Size | UL packet | DL packet | PGW profile | UE Profile |
|---|---|---|---|---|---|
| Version | 4 | set | set | set to version | set to version |
| Traffic Class | 8 | set | set | set to 0 | set to 0 |
| Flow Label | 20 | set | set | set to 0 | set to 0 |
| Payload Length | 16 | set | set | calculate | calculate |
| Next Header | 8 | set | set | set to UDP | set to UDP |
| Hop Limit | 8 | set | no | set to max | NA |
| Source Address | 128 | set | set | set base on a priori information | set base on a priori information |
| Destination Address | 128 | set | set | set base on a priori information | set base on a priori information |

IPv4 Header

| Field | Size | UL packet | DL packet | PGW profile | UE Profile |
|---|---|---|---|---|---|
| Version | 4 | set | set | set to version | set to version |
| Header Length | 4 | set | set | calculate | calculate |
| Type of Service | 8 | set | no | set based on profile | NA |
| Packet Length | 16 | set | set | calculate | calculate |
| Identification | 16 | set | no | set to don't fragment | NA |
| Reserved Flag | 1 | set | no | NA | NA |
| Don't Fragment Flag | 1 | set | set | set to don't fragment | set to don't fragment |
| More Fragments Flag | 1 | set | set | set to "not set" | set to "not set" |
| Fragment Offset | 13 | set | set | set to "not set" | set to "not set" |
| Time to Live | 8 | set | set | set to "N" value | set to "N" value |
| Protocol | 8 | set | set | set to UDP | set to UDP |
| Header Checksum | 16 | set | set | calculate | calculate |
| Source Address | 32 | set | set | set base on a priori information | set base on a priori information |
| Destination Address | 32 | set | set | set base on a priori information | set base on a priori information |

UDP Header

| Field | Size | UL packet | DL packet | PGW profile | UE Profile |
|---|---|---|---|---|---|
| Source Port | 16 | set | set | set base on a priori information | set base on a priori information |
| Destination Port | 16 | set | set | set base on a priori information | set base on a priori information |
| Length | 16 | set | set | calculate | calculate |
| Checksum | 16 | set | no | calculate | NA |

As shown in the profile entries in the tables above, when reconstructing the various headers, certain fields are designated to be set with predetermined values and/or parameters. For example, in the IP headers, the Version field is populated with and/or set to the respective version, i.e., 4 for IPv4 headers and 6 for IPv6 headers. Similarly, in the reconstruction of IPv6 headers, the Traffic Class and Flow Label are set to zero; the Next Header field is set to "UDP" to indicate that a UDP header follows; and, the Hop Limit field for UL packets is set to its maximum, while for the DL packets it is unset and hence the profile entry for the UE is not applicable (NA). Likewise, in the reconstruction of IPv4 headers, there are profile entries which prescribe specific values and/or parameters which are to be used to fill the fields of reconstructed headers, and there are profile entries which are NA. For example, the Don't Fragment Flag field is set to don't fragment, the More Fragments Flag and Fragment Offset fields are set to not set, the Time to Live field is set to a value N, the Protocol field is set to UDP; etc. Of course, when completely stripped or removed from a data packet, the size of the respective header or field may be reduced to zero bits.

Also as shown in the above tables, various fields in the reconstructed headers are populated with calculated values as per the corresponding profile entries indicating "calculate." In particular, these fields are the various respective payload, packet and header lengths and the checksums which can be readily calculated from actual, known, measured and/or otherwise determined values associated with and/or obtained from the particular packet for which the header is being rebuilt.

Additionally, other profile entries indicate and/or prescribe that certain fields of the reconstructed headers (namely, source and destination addresses and source and destination ports) are to be set based upon certain a priori information known by, communicated to and/or otherwise available to the respective NE or node (i.e., the PGW and/or UE as the case may be).

For example, when the UE initiates a real time packet traffic call or session (e.g. such as a VoLTE call), the source and destination IP addresses and the source and destination ports (i.e., the a priori information) are generally known and/or available to the UE. In one suitable embodiment, this information may be obtained by the UE from the UDP/IP packet headers that are being removed by the UE. In practice, this a priori information relating to and/or identifying the source and destination IP addresses and source and destination ports is saved, cached and/or otherwise retained by the UE for use in rebuilding the respective headers according to the corresponding profile entries for the UE.

As for the PGW, it may obtain the a priori information (i.e., source and destination IP addresses and source and destination ports) in a number of ways and save, cache and/or otherwise retain the same for use in rebuilding the respective headers according to the corresponding profile entries for the PGW. Suitably, the relevant a priori information and the particular UE with which traffic and/or packets are associated is determined by and/or set forth in a Traffic Flow Template (TFT) established in accordance with the setup of the corresponding call or session. For example, in one suitable embodiment, when a Session Initiation Protocol (SIP) client (i.e., the UE) is involved in a Voice over IP (VoIP) and/or video call or other like real time packet traffic call or session, an IP Multimedia Subsystem (IMS) transfers the source and destination IP addresses, source and destination ports and UDP information to the various NEs of the LTE wireless network, including the PGW. In another suitable embodiment, the UE may communicate the a priori information to the PGW. For example, at or proximate the setting-up and/or establishment of a real time packet traffic call and/or session, the UE may allow a first one or some initial number of packets to retain their UDP/IP headers when being transmitted toward and/or transported to the PGW. In this way, the PGW can obtain the relevant a priori information from the so received header or headers. Thereafter, the UE may then remove the respective UDP/IP headers from subsequent UL packets in order to eliminate and/or reduce the header overhead.

With reference now to FIG. 1, there is shown an exemplary network architecture suitable for practice of aspect(s) of the inventive subject matter. As shown, the UE 10 connects to and/or communicates with an eNB and/or evolved-Universal Mobile Telecommunications System (UMTS) Terrestrial Radio Access Network (e-UTRAN) 20, e.g., via an LTE-Uu interface. The eNB and/or e-UTRAN 20 in turn connects to and/or communicates with a Serving Gateway (SGW) 30, e.g., via an S1-U interface; and the SGW 30 connects to and/or communicates with the PGW 40, e.g., via an S5 interface. In turn, the PGW 40 connects to and/or communicates with a packet network (e.g., such as the Internet) and a network operator's IP services 50 (e.g., including an IMS) via an SGi interface for example.

In practice, the IP/UDP layer for VoIP and/or video and/or other like real time packet traffic is transported between the UE 10 and the PGW 40. A General Packet Radio Service (GPRS) Tunneling Protocol (GTP) is used to tunnel user data between the eNB 20 and the SGW 30 as well as between the SGW 30 and the PGW 40 in the backbone network by encapsulating all end user IP/UDP packets. Hence, the SGW 30 and eNB 20 are generally transparent to the approach described herein.

Figure 2:
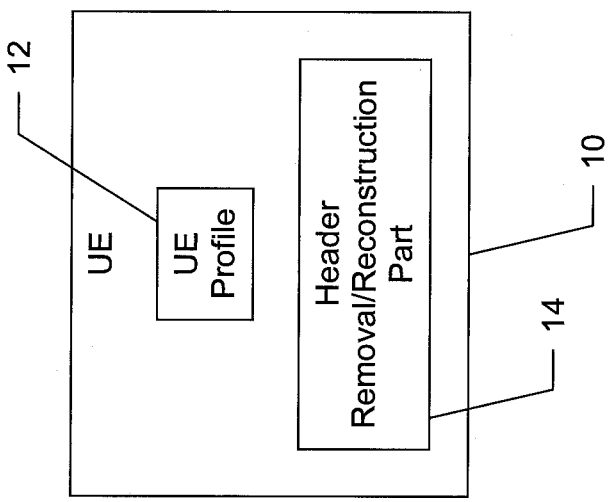
FIG. 2 is a diagrammatic illustration showing an exemplary UE suitable for practicing aspect(s) of the inventive subject matter.

FIG. 2 illustrates an exemplary UE 10 suitable for practicing aspect(s) of the inventive subject matter. As shown, the UE 10 is provisioned with the UE profile 12 as described herein. The UE 10 is also provisioned with a header removal and/or reconstructing engine 14 that performs header removal and/or reconstruction as described herein.

Figure 3:
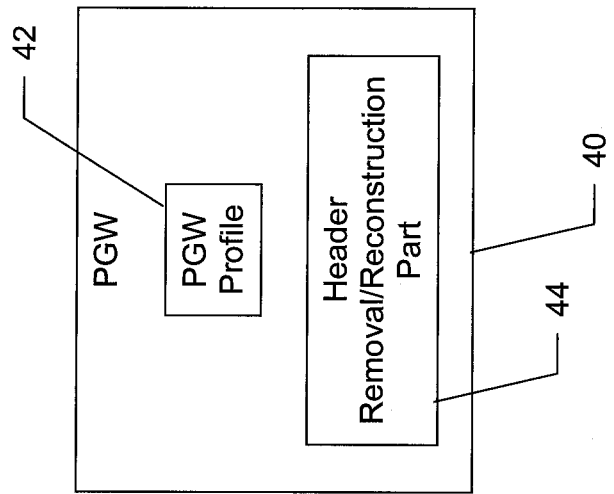
FIG. 3 is a diagrammatic illustration showing an exemplary PGW suitable for practicing aspect(s) of the inventive subject matter.

FIG. 3 illustrates an exemplary PGW 40 suitable for practicing aspect(s) of the inventive subject matter. As shown, the PGW 40 is provisioned with the PGW profile 42 as described herein. The PGW 40 is also provisioned with a header removal and/or reconstructing engine 44 that performs header removal and/or reconstruction as described herein.

Figure 4:
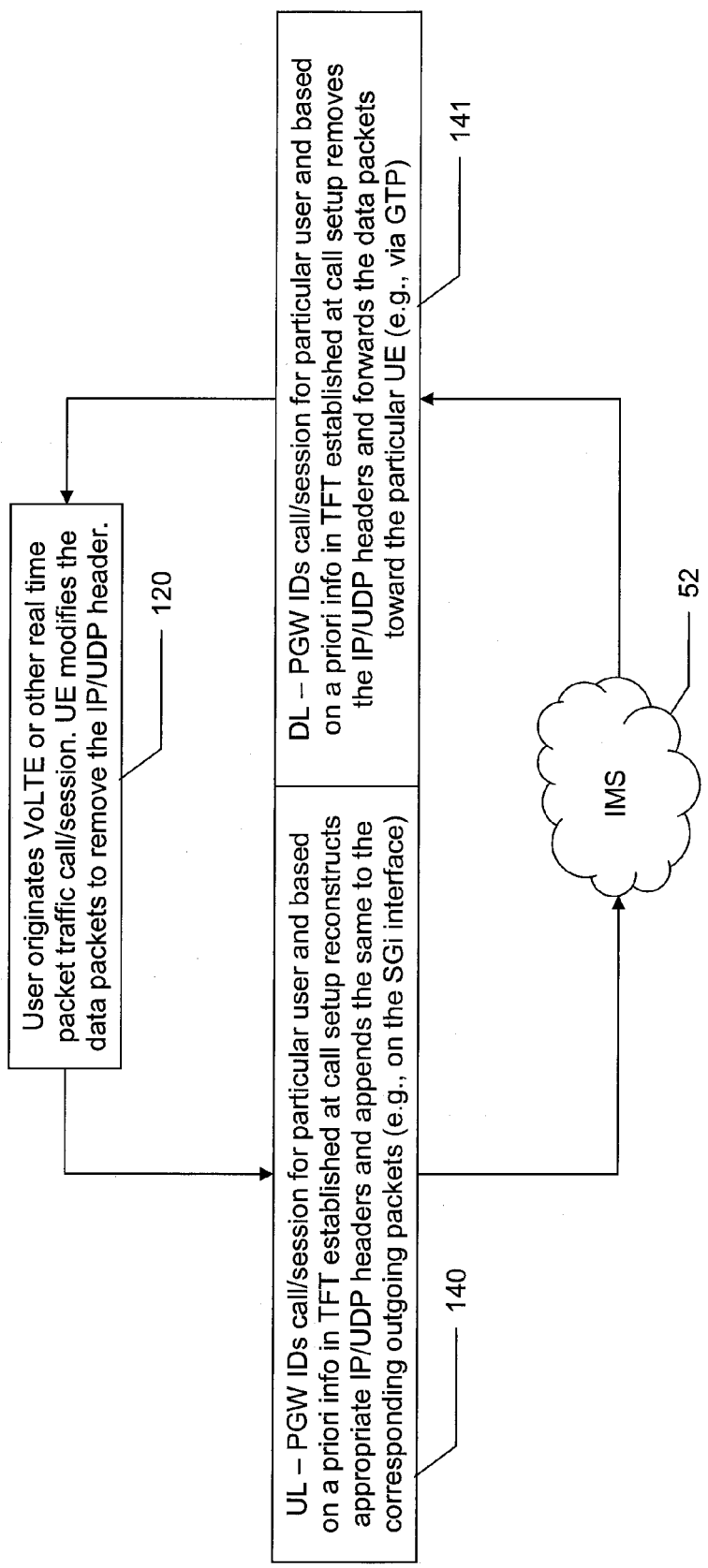
FIG. 4 is a flow diagram showing the operation of an exemplary header overhead reduction process and/or method in accordance with aspect(s) of the inventive subject matter.

With reference now to FIG. 4, there is shown an exemplary process and/or method in accordance with aspect(s) of the inventive subject matter. In particular, box 120 represents the UE 10 and/or operation thereof. Boxes 140 and 141 represent the PGW 40 and/or the operation thereof in the UL direction and DL direction, respectively.

In the illustrated example, at box 120, a user originates or initiates a real time packet traffic call or session, such as, e.g., a VoLTE call. Suitably, the header removal/reconstruction engine 14 of the UE 10 modifies the outgoing data packets directed to the PGW 40 by removing the IP/UDP headers therefrom.

Accordingly, at box 140 (i.e., in the UL direction), the PGW 40 receives the data packets sent from the UE 10 without their IP/UDP headers. The PGW 40 identifies the call or session as being associated with the particular user and based on the a priori information, e.g., in the TFT established during the call/session setup, the header reconstruction engine 44 of the PGW 40 reconstructs an appropriate IP/UDP header for the received data packets. In turn, the reconstructed headers are appended (or more precisely prepended) to corresponding outgoing data packets, for example, forwarded to the IMS 52 or other packet data network on the SGi interface.

In the opposite traffic flow direction, at box 141 (i.e., in the DL direction), the PGW 40 receives call and/or session traffic directed toward the UE, e.g., from the IMS 52. Again, the PGW 40 identifies that the call and/or session traffic is for a particular user and the header removal engine 44 of the PGW 40 modifies the data packets to remove the IP/UDP headers therefrom. In turn, the PGW 40 forwards the data packets without their IP/UDP headers on to the appropriate UE 10, e.g., using the GTP.

While described above with respect to specific examples and/or embodiments, it is to be appreciated that various alternatives are contemplated. For example, it is to be appreciated that in connection with the particular exemplary embodiment(s) presented herein certain structural and/or function features or parts are described as being incorporated in defined elements and/or components. However, it is contemplated that these features or parts may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

Additionally, it is contemplated that the ideas and/or approach described herein, while illustrated with reference to an LTE wireless network, are also amenable and/or adaptable to other networks and/or environments. Also, it is contemplated there may be relatively large growth in Machine to Machine (M2M) communications that will tend to involve relatively small messages which are exchanged relatively frequently. In such a case, considering the relatively large numbers of devices and frequency of messages, it is possible to make improvements in the IP/UDP or IP/TCP overhead by making use of the ideas and/or approaches described herein.

It is also to be appreciated that any one or more of the particular tasks, steps, processes, analysis, methods, functions, elements, parts and/or components described herein may suitably be implemented via hardware, software, firmware or a combination thereof. For example, the various elements, parts and/or nodes may include a processor, e.g., embodied by a computing or other electronic data processing device, that is configured and/or otherwise provisioned to perform one or more of the tasks, steps, processes, analysis, methods and/or functions described herein. For example, one or more computers or servers or other electronic data processing devices may be employed in the system and may be provided, supplied and/or programmed with a suitable listing of code (e.g., such as source code, interpretive code, object code, directly executable code, and so forth) or other like instructions or software or firmware (e.g., such as an application to perform and/or administer the processing and/or image analysis described herein), such that when run and/or executed by the computer or other electronic data processing device one or more of the tasks, steps, processes, analysis, methods and/or functions described herein are completed or otherwise performed. Suitably, the listing of code or other like instructions or software or firmware is implemented as and/or recorded, stored, contained or included in and/or on a non-transitory computer and/or machine readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, analysis, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, analysis, methods and/or functions described herein can be used.

Additionally, it is to be appreciated that certain elements and/or parts described herein as incorporated together may under suitable circumstances be stand-alone elements or otherwise divided. Similarly, a plurality of particular functions described as being carried out by one particular element or part may be carried out by a plurality of distinct elements acting independently to carry out individual functions, or certain individual functions may be split-up and carried out by a plurality of distinct elements or parts acting in concert. Alternately, some elements, parts or components otherwise described and/or shown herein as distinct from one another may be physically or functionally combined where appropriate.

In short, the specification has been set forth with reference to preferred and/or other embodiments. Obviously, modifications and alterations will occur to others upon reading and understanding the specification. It is intended that the invention be construed as including all such modifications and alterations insofar as they come within the scope of the appended claims or the equivalents thereof.

What is claimed is:

1. A method for controlling header overhead in a mobile telecommunications network, said method comprising:

receiving at a User Equipment (UE) one or more modified downlink data packets associated with a session for real time data packet traffic between the UE and a Packet Data Network (PDN) Gateway (PGW), the one or more modified downlink data packets being data packets that have had at least one downlink header field removed from at least one of an Internet Protocol (IP) header and a User Datagram Protocol (UDP) header prior to the receiving of said one or more modified downlink data packets; and reconstructing at the UE the at least one downlink header field removed from the IP and UDP headers for the one or more modified downlink data packets associated with the session using information obtained by the UE prior to receiving the one or more modified downlink data packets to form a corresponding at least one reconstructed downlink header field for the corresponding modified downlink data packet;

wherein the information obtained by the UE prior to receiving the one or more modified downlink data packets includes information in at least one of the IP and UDP headers of at least one downlink data packet associated with the session.

2. The method of claim 1, said method further comprising:
at least one of prepending or appending each of the at least one reconstructed downlink header field to the corresponding modified downlink data packet.

3. The method of claim 1, wherein said one or more modified downlink data packets are data packets that have had all downlink header fields removed from the IP and UDP headers.

4. The method of claim 1, wherein the one or more modified downlink data packet are transported between the UE and the PGW at least partially through a tunnel established in accordance with a General Packet Radio Service (GPRS) Tunneling Protocol (GTP).

5. The method of claim 1, further comprising:
provisioning the UE with a UE profile which specifies how one or more downlink header fields removed from at least one of the IP and UDP headers are to be reconstructed.

6. A Packet Data Network (PDN) Gateway (PGW) for use in a mobile telecommunications network, the PGW comprising at least one processor and associated memory, the at least one processor configured to:
receive one or more modified uplink data packets associated with a session for real time data packet traffic between the PGW and a User Equipment (UE), the one or more modified uplink data packets being data packets that have had at least one uplink header field removed from at least one of an Internet Protocol (IP) header and a User Datagram Protocol (UDP) header prior to receiving the one or more modified uplink data packets; and
reconstruct the at least one uplink header field removed from said IP and UDP headers for the one or more modified uplink data packets associated with the session using information obtained by the PGW prior to receiving the one or more modified uplink data packets to form a corresponding at least one reconstructed uplink header field for the corresponding modified uplink data packet;
wherein the information obtained by the PGW prior to receiving the one or more modified uplink data packets includes information in at least one of the IP and UDP headers of at least one uplink data packet associated with the session.

7. The PGW of claim 6, wherein the at least one processor is further configured to:
at least one of prepend or append each of the at least one reconstructed uplink header field to the corresponding modified uplink data packet.

8. The PGW of claim 6, wherein the one or more modified uplink data packets are data packets that have had all uplink header fields removed from the IP and UDP headers and the PGW is configured to reconstruct the IP and UDP headers removed from the one or more modified uplink data packets associated with the session.

9. The PGW of claim 6, wherein the PGW is provisioned with a profile that specifies how one or more uplink header fields removed from at least one of the IP and UDP headers are to be reconstructed.

10. The PGW of claim 6, wherein the at least one processor is further configured to:
obtain the information prior to receiving the one or more modified uplink data packets for use in reconstructing the at least one uplink header field removed from at least one of the IP and UDP headers.

11. The PGW of claim 10, wherein the information includes at least one of a source address, a destination address, a source port and a destination port.

12. The PGW of claim 10, wherein the at least one processor is configured to obtain the information from at least one uplink data packet received from the UE with at least one of the IP header and the UDP header intact.

13. The PGW of claim 10, wherein the at least one processor is configured to obtain the information from an IP Multimedia Subsystem (IMS).

14. The PGW of claim 6, wherein the at least one processor is further configured to:
modify one or more downlink data packets associated with the session to form a corresponding one or more modified downlink data packets, the one or more downlink data packets being modified by removing at least one downlink header field from at least one of the IP and UDP headers of the corresponding downlink data packets; and
forward the one or more modified downlink data packets to the UE;
wherein the UE is configured to reconstruct the at least one downlink header field removed from the IP and UDP headers for the one or more modified downlink data packets associated with the session using information obtained by the UE prior to receiving the one or more modified downlink data packets to form a corresponding at least one reconstructed downlink header field for the corresponding modified downlink data packet.

15. A User Equipment (UE) for use in a mobile telecommunications network, the UE comprising at least one processor and associated memory, the at least one processor configured to:
modify one or more uplink data packets associated with a session for real time data packet traffic between the UE and a Packet Data Network (PDN) Gateway (PGW) to form a corresponding one or more modified uplink data packets, the one or more uplink data packets being modified by removing at least one uplink header field from at least one of an Internet Protocol (IP) header and a User Datagram Protocol (UDP) header of the corresponding uplink data packets; and
send the one or more modified uplink data packets toward the PGW;
wherein the PGW is configured to reconstruct the at least one uplink header field removed from the IP and UDP headers for the one or more modified uplink data packets associated with the session using information obtained by the PGW prior to receiving the one or more modified uplink data packets to form a corresponding at least one reconstructed uplink header field for the corresponding modified uplink data packet;
wherein the information obtained by the PGW prior to receiving the one or more modified uplink data packets includes information in at least one of the IP and UDP headers of at least one uplink data packet associated with the session.

16. The UE of claim 15, wherein said at least one processor is further configured to:
not modify at least one uplink data packet associated with the session such that the at least one uplink data packet retains IP and UDP headers; and
send the at least one uplink data packet that has not been modified toward the PGW prior to sending the one or more modified uplink data packets toward the PGW;
wherein the PGW is configured to reconstruct the at least one uplink header field removed from the IP and UDP headers of the one or more modified uplink data packets associated with the session using information obtained by the PGW from the at least one uplink data packet that was not modified.

17. The method of claim 1, further comprising:
receiving at the PGW one or more modified uplink data packets associated with the session, the one or more modified uplink data packets being data packets that have had at least one uplink header field removed from at least one of the IP header and the UDP header prior to the receiving of the one or more modified uplink data packets; and
reconstructing the at least one uplink header field removed from the IP and UDP headers for the one or more modified uplink data packets associated with the session using information obtained by the PGW prior to receiving the one or more modified uplink data packets to form a corresponding at least one reconstructed uplink header field for the corresponding modified uplink data packet.

18. The method of claim 17, wherein the information obtained by the PGW prior to receiving the one or more modified uplink data packets includes at least one of information provisioned to the PGW in a PGW profile, information provided to the PGW in a traffic flow template (TFT) associated with the session, information in at least one of the IP and UDP headers of at least one uplink data packet associated with the session, and information provisioned to the PGW for calculation of certain uplink header fields.

19. The method of claim 1, wherein the information obtained by the UE prior to receiving the one or more modified downlink data packets also includes at least one of information provisioned to the UE in a UE profile, information provided to the UE in a traffic flow template (TFT) associated with the session, and information provisioned to the UE for calculation of certain downlink header fields.

20. The UE of claim 15, wherein the UE is further configured to:
receive one or more modified downlink data packets associated with the session, the one or more modified downlink data packets being data packets that have had at least one downlink header field removed from at least one of the IP and UDP headers prior to receiving the one or more modified downlink data packets; and
reconstruct the at least one downlink header field removed from the IP and UDP headers for the one or more modified downlink data packets associated with the session using information obtained by the UE prior to receiving the one or more modified downlink data packets to form a corresponding at least one reconstructed downlink header field for the corresponding modified downlink data packet.

* * * * *